(12) United States Patent
Abou-Assali et al.

(10) Patent No.: US 9,172,822 B2
(45) Date of Patent: Oct. 27, 2015

(54) METHODS, SYSTEMS, AND COMPUTER READABLE MEDIA FOR PROVIDING A USER RECORD DELETION NOTIFICATION

(75) Inventors: Tarek Abou-Assali, Boston, MA (US); Joseph Wonseok Lee, Pleasanton, CA (US)

(73) Assignee: TEKELEC, INC., Morrisville, NC (US)

( * ) Notice: Subject to any disclaimer, the term of this patent is extended or adjusted under 35 U.S.C. 154(b) by 692 days.

(21) Appl. No.: 13/465,485

(22) Filed: May 7, 2012

(65) Prior Publication Data

US 2012/0282955 A1    Nov. 8, 2012

Related U.S. Application Data

(60) Provisional application No. 61/483,607, filed on May 6, 2011.

(51) Int. Cl.
*H04W 68/00* (2009.01)
*G06F 15/16* (2006.01)
*H04M 15/00* (2006.01)
(Continued)

(52) U.S. Cl.
CPC ....... *H04M 15/8044* (2013.01); *H04L 12/1403* (2013.01); *H04L 12/1407* (2013.01); *H04M 15/66* (2013.01); *H04W 48/18* (2013.01); *H04W 8/12* (2013.01); *H04W 88/182* (2013.01)

(58) Field of Classification Search
USPC .............. 370/310.2, 328, 329, 331, 338, 341; 455/466, 406, 411, 432.1, 433, 435.1, 455/445
See application file for complete search history.

(56) References Cited

U.S. PATENT DOCUMENTS 8,547,908 B2* 10/2013 Marsico ......................... 370/328
8,750,126 B2*  6/2014 McCann et al. .............. 370/236
(Continued)

FOREIGN PATENT DOCUMENTS

WO    WO 2010/139360 A1    12/2010

OTHER PUBLICATIONS

3GPP TS 23.203 V8.3.1 (Sep. 2008) "3rd Generation Partnership Project; Technical Specification Group Core Network and Terminals; Policy and charging control architecture (Release 8)" Sep. 2008— (Retrieved from the Internet: http:I/www.quintillion.co.jp13GPPISpecs123203-831.pdf).*

(Continued)

*Primary Examiner* — Khawar Iqbal
(74) *Attorney, Agent, or Firm* — Jenkins, Wilson, Taylor & Hunt, P.A.

(57) ABSTRACT

Methods, systems, and computer readable media for providing a user record deletion notification are disclosed. In one example, the method comprises determining, at a subscriber data management (SDM) node, that a service subscription to an access network is to be terminated, wherein the service subscription is associated with a subscriber user, generating, at the SDM node, a notification message that includes a deletion notification attribute, and sending the Diameter notification message to an application server associated with the access network. The method further includes terminating, at the application server, a communication service connection established between the subscriber user and the access network in response to detecting the deletion notification attribute in the notification message and deleting, in the SDM node, a user record associated with the service subscription after receiving notification of the connection termination.

19 Claims, 4 Drawing Sheets

(51) Int. Cl.
*H04L 12/14* (2006.01)
*H04W 48/18* (2009.01)
*H04W 88/18* (2009.01)
*H04W 8/12* (2009.01)

(56) References Cited

U.S. PATENT DOCUMENTS

| | | | |
|---|---|---|---|
| 8,942,747 B2* | 1/2015 | Marsico | 455/515 |
| 8,958,306 B2* | 2/2015 | McCann et al. | 370/241 |
| 2010/0290392 A1 | 11/2010 | Rasanen et al. | |
| 2011/0119363 A1* | 5/2011 | Hua et al. | 709/223 |
| 2011/0138005 A1* | 6/2011 | Zhou et al. | 709/206 |
| 2011/0225280 A1* | 9/2011 | Delsesto et al. | 709/223 |
| 2011/0320622 A1* | 12/2011 | Cutler et al. | 709/230 |
| 2012/0142311 A1* | 6/2012 | Rui et al. | 455/406 |
| 2012/0202491 A1* | 8/2012 | Fox et al. | 455/435.1 |
| 2012/0202550 A1* | 8/2012 | Marsico | 455/515 |
| 2012/0257499 A1* | 10/2012 | Chatterjee et al. | 370/232 |
| 2013/0041994 A1* | 2/2013 | Terrien et al. | 709/223 |
| 2013/0065606 A1* | 3/2013 | Kurokawa et al. | 455/456.1 |
| 2013/0190023 A1* | 7/2013 | Bhatt et al. | 455/466 |

OTHER PUBLICATIONS

Notification of Transmittal of the International Search Report and the Written Opinion of the International Searching Authority, or the Declaration for International Patent Application No. PCT/US2012/036784 (Nov. 1, 2012).

PCT International Patent Application No. PCT/US2012/036784, Titled, "Methods, Systems, and Computer Readable Medai for STeering a Subscriber Between Access Networks," (Unpublished, Filed May 7, 2012).

3rd Generation Partnership Project, "Technical Specifiation Group Services and System Aspects; Policy and charging control archiecture (Release 11)," 3GPP TS 23.203, v11.5.0 (Mar. 2012).

3GPP, "3rd Generation Partnership Project; Technical Specification Group Core Network and Terminals; Sh Interface based on the Diameter protocol; Protocol details (Release 8)," 3GPP TS 29.329, V8.8.0 (Dec. 2010).

Calhoun et al., "Diameter Base Protocol," RFC 3588, pp. 1-147 (Sep. 2003).

* cited by examiner

```
Diameter Message: PNR
Version: 1
Cmd Flags: REQ,PXY
Cmd Code: 309
App-Id: 16777217
Hop-By-Hop-Id: 1972679110
End-To-End-Id: 1187649124
  Session-Id = pcrf.op1.com;1254864972;7086
  Origin-Host = spr.op1.com
  Origin-Realm = op1.com
  Vendor-Specific-Application-Id =
    Vendor-Id = 10415
    Auth-Application-Id (258,M,l=12) = 16777217
  Auth-Session-State = NO_STATE_MAINTAINED (1)
  Destination-Realm = op1.com
  Destination-Host = pcrf.op1.com
  User-Identity =
    Public-Identity = sip:311480000000121@ims.mnc480.mcc311.3gppnetwork.org
                                        //IMSI wrapped in a SIP URI format
  User-Data =
    <?xml version="1.0" encoding="UTF-8"?>
    <Sh-Data>
      <RepositoryData>
        <ServiceIndication>CamiantUserData</ServiceIndication>
        <SequenceNumber>1</SequenceNumber>
        <ServiceData>
          <lifetime=0>
        </ServiceData>
      </RepositoryData>
    </Sh-Data>
```

200 — entire message
201 — User-Identity block
202 — Public-Identity line
203 — User-Data block
204 — ServiceData
205 — lifetime=0

METHODS, SYSTEMS, AND COMPUTER READABLE MEDIA FOR PROVIDING A USER RECORD DELETION NOTIFICATION

PRIORITY CLAIM

This application claims the benefit of U.S. Provisional Patent Application Ser. No. 61/483,607 filed May 6, 2011; the disclosure of which is incorporated herein by reference in its entirety.

TECHNICAL FIELD

The subject matter described herein relates to the communication of notification signaling messages between network nodes. More specifically, the subject matter relates to methods, systems, and computer readable media for providing a user record deletion notification.

BACKGROUND

At present, problems exist with notifying a policy and charging rules function (PCRF) node of user record deletions stored in a subscriber data management (SDM) node. Although the SDM node may be configured to transmit a notification messages, such Diameter Push Notifications Request (PNR) messages, to inform the PCRF node about any user data or profile change, there is no existing process/mechanism that allows the SDM node to inform the PCRF node that an entire user record is to be deleted. The PNR message includes a user identifier (ID) and user data portion that includes the user profile. Notably, sending a PNR message to the PCRF node without including a user profile section in an attempt to serve as a user record deletion notification is not feasible since a PCRF node is configured to reject such a notification.

Accordingly, a need exists for improved methods, systems, and computer readable media providing a user record deletion notification.

SUMMARY

Methods, systems, and computer readable media for providing a user record deletion notification are disclosed. One exemplary method comprises determining, at a subscriber data management (SDM) node, that a service subscription to an access network is to be terminated, wherein the service subscription is associated with a subscriber user, generating, at the SDM node, a notification message that includes a deletion notification attribute, and sending the Diameter notification message to an application server associated with the access network. The method further includes terminating, at the application server, a communication service connection established between the subscriber user and the access network in response to detecting the deletion notification attribute in the notification message and deleting, in the SDM node, a user record associated with the service subscription after receiving notification of the connection termination. As used herein, the term "node" refers to a physical computing platform including one or more hardware processors and associated memory.

The subject matter described herein may be implemented in software in combination with hardware and/or firmware. For example, the subject matter described herein may be implemented in software executed by a processor. In one exemplary implementation, the subject matter described herein for providing a user record deletion notification may be implemented using a non-transitory computer readable medium to having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for providing a user record deletion notification. In one embodiment, the present subject matter includes a subscriber data management (SDM) node that determines (e.g., is notified) that a subscriber user's subscription to an access network is to be canceled or terminated. In one embodiment, the SDM node may receive a cancellation message (e.g., a delete user record command) that may trigger the SDM node to include a deletion notification attribute in the stored peer profile data associated with the subscriber user. Although the present subject matter is described in the context of an SDM node communicating with a PCRF node, any network node or data client with an interface that supports change notification but not deletion notification may be utilized without departing from the scope of the present subject matter. For instance, any application server node (e.g., a telephony application server (TAS) or a short message service center (SMSC) server) using a Sh interface or Ud interface may be utilized to receive and process a notification message that includes a deletion notification attribute.

After determining that a subscriber user record and associated subscription to the access network is to be deleted, the SDM node generates a notification message from user profile data that includes the deletion notification attribute, which is then embedded in a user profile portion of the notification message, such as a Diameter PNR message or an Extensible Markup Language (XML) Notify Request message. As used herein, the term Diameter refers to the authentication, authorization, and accounting (AAA) protocol utilized by telecommunications and computer networks as defined by RFC 3588.

In one embodiment, the deletion notification attribute included in the notification message serves as an indication that the user subscription has been requested by a subscriber provisioning system to be terminated and that the subscriber user should be disconnected from the access network. In one embodiment, the deletion notification attribute name is entitled "lifetime" and the associated value/indicator is set to a zero (0) value. Upon receiving and recognizing the notification message with the deletion notification attribute from the SDM node, the application server (e.g., a PCRF node) may then terminate the user service and force-disconnect the subscriber user from the access network. After terminating the connection to the network, the application server may notify the SDM node that the subscriber user has been disconnected.

Figure 1:
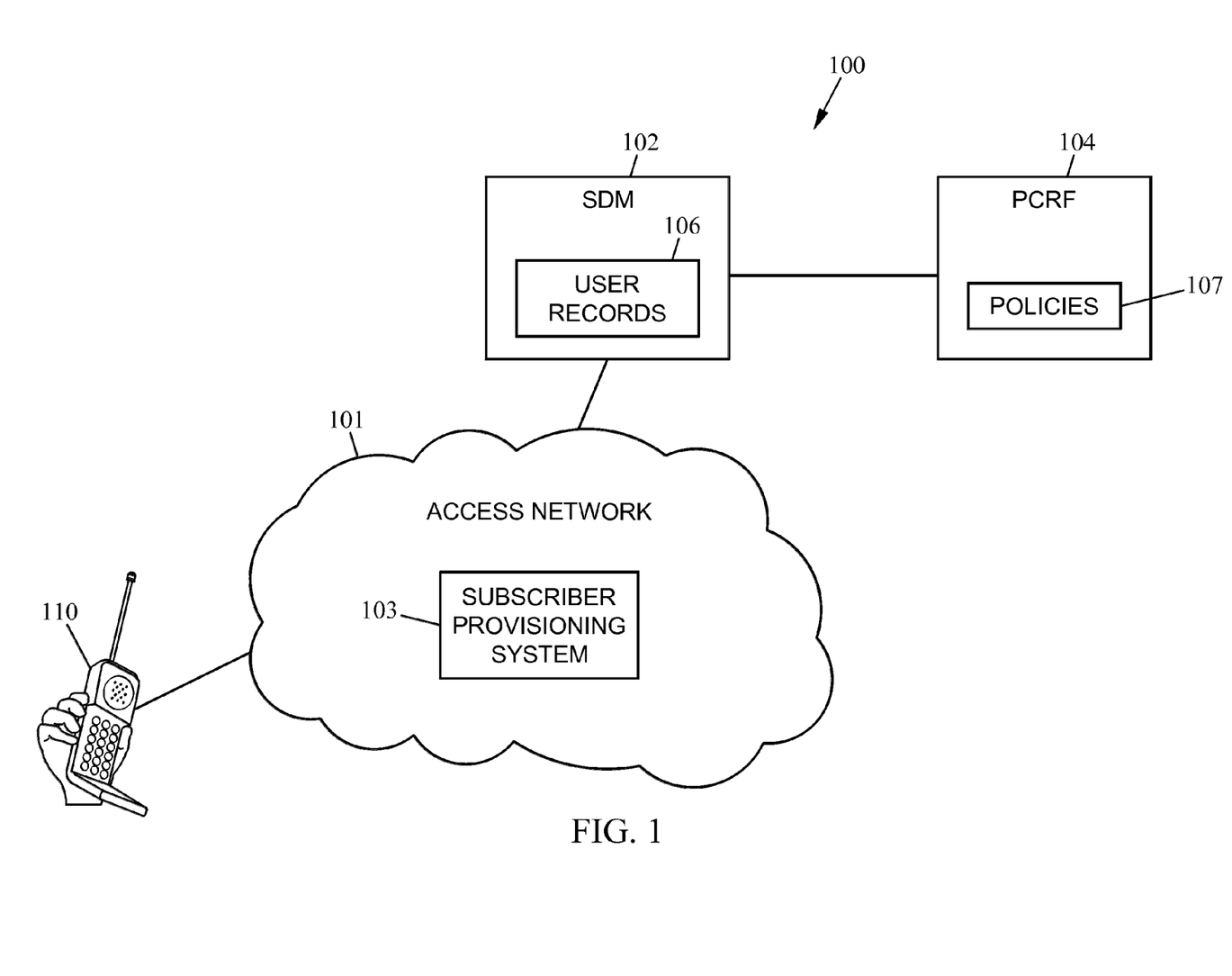
FIG. 1 is a block diagram illustrating a system for providing a user record deletion notification according to an embodiment of the subject matter described herein.

FIG. 1 depicts an exemplary system 100 that comprises a plurality of network elements that may be utilized to provide a user record deletion notification to an application server. In one embodiment, system 100 includes an access network 101, a subscriber data management (SDM) node 102 (e.g., a subscription profile repository (SPR) as defined by 3GPP TS 23.203), and a policy and charging rules function (PCRF) node 104. Although Figure depicts PCRF node 104, any other application server or data client (e.g., a TAS or SMSC) capable of communicating via a Sh interface or Ud interface may be used without departing from the scope of the present subject matter.

Access network 101 may include any telecommunications-based network that services subscriber user devices (e.g., a mobile smartphone, a personal digital assistant, a computer tablet, a personal computer, etc.) associated with a plurality of subscriber users (e.g., a subscriber user 110). For example, access network 101 may include, but is not limited to, a 3G wireless network, a 4G wireless network, an Long Term Evolution (LTE) network, a cable fixed network, a digital subscriber line (DSL) fixed network, and a fiber optic-based fixed network. Alternatively, the present subject matter may be deployed in other network implementations without departing from the scope of the present subject matter.

In one embodiment, access network 101 includes a subscriber provisioning system 103, which may comprise one or more network elements, nodes, or servers (e.g., a single subscriber provisioning server) configured to facilitate and manage a subscriber user's access to network 101. Subscriber provisioning system 103 may be configured to administer user profile data to SDM node 102. For example, when a subscriber user registers for access network services, subscriber provisioning system 103 creates a new user record and provisions the record in SDM 102. The user record contains user profile data that includes all parameters and attributes required for the access network to provide service (e.g., call forwarding options, roaming allowed flag, etc.) to the subscriber user. Subscriber provisioning system 103 may also be configured to maintain status information and records associated with the active users subscribed to access network 101. In the event a subscriber user record (and access network subscription) associated with a subscriber user 110 is to be deleted/terminated (e.g., either subscriber user 110 or subscriber provisioning system 103 cancels or terminates service), subscriber provisioning system 103 may issue a delete user record command or similar cancellation/termination message to SDM node 102.

In one embodiment, SDM node 102 may include a subscription profile repository (SPR) node or any other like network node/element that is configured to store subscription records associated with subscriber users (e.g., "user records"). SDM node 102 may be provisioned with a subscriber profile record database 106 which includes various subscriber user profile data stored in subscriber user records. In one embodiment, SDM node 102 is configured to process the delete user record command by updating the user profile data associated with subscriber user 110 to include the deletion notification attribute in subscriber profile record database 106 (e.g., if an application server's subscription to a change notification is active (and stored at the SDM). SDM node 102 may then generate a notification message, such as a PNR message, using the modified user profile data. Specifically, the generated notification message includes the deletion notification attribute in a user profile portion/section of the message. SDM node 102 may be communicatively connected to an application server, such a PCRF node 104.

In one embodiment, PCRF node 104 is configured to authorize various user traffic by making intelligent policy decisions using configured policies, dynamic network data, and user profile data for each subscriber active in network 101. Although PCRF node 104 is depicted in FIG. 1, any other network node configured to communicate via a Sh interface or Ud interface may be used to receive the deletion notification attribute without departing from the scope of the present subject matter. PCRF node 104 may be further configured to provide charging rules, including quality of service (QoS), based on a number of subscription based factors, such as user class. In one embodiment, PCRF node 104 may also include a policies database 107 which is configured to store the aforementioned policies and associated billing/charging rules corresponding to each of a plurality of subscriber users. PCRF node 104 may also be configured to store subscription profile information associated with the plurality of subscriber users. In one embodiment, the subscription profile information is access network specific. Specifically, the subscription profile information includes data indicative of the access network(s) in which each stored subscriber user has an active subscription.

Upon receiving the delete user record command from subscriber provisioning system 103, SDM node 102 may be configured to send the generated PNR message with a deletion notification attribute to PCRF node 104 (e.g., if the PCRF node's subscription to a change notification is active). Notably, the PNR message may include a deletion notification attribute embedded in a user profile portion of the notification message in such a manner that the PNR message may function as (and be received/accepted as) a user record deletion notification to the receiving PCRF node.

Figure 2:
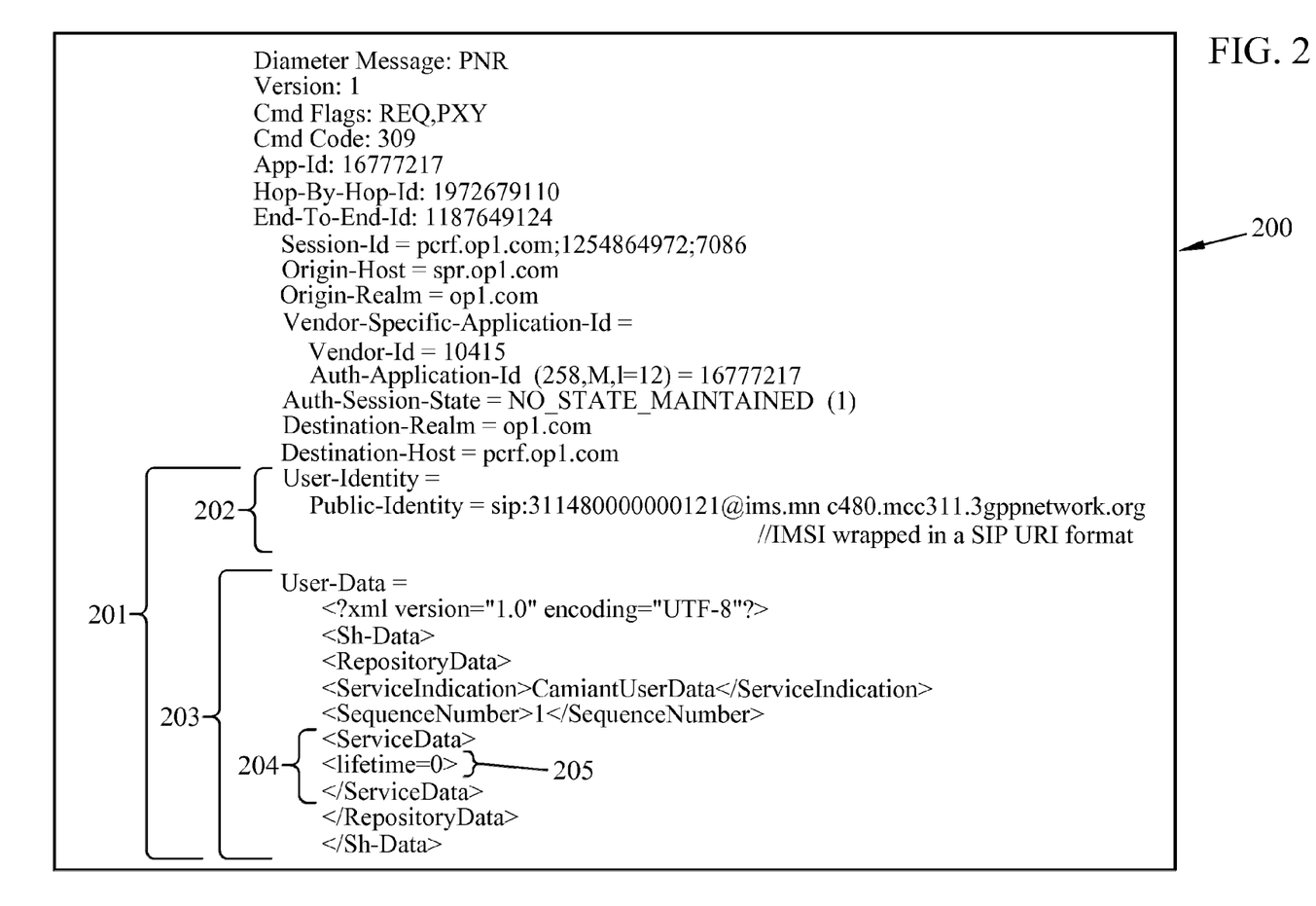
FIG. 2 is an exemplary Diameter Push Notifications Request (PNR) message that includes a deletion notification attribute in a user data portion according to an embodiment of the subject matter described herein.

FIG. 2 depicts an exemplary Diameter PNR message 200. In one embodiment, PNR message 200 includes a user record portion 201 that includes a subscriber user identifier (ID) in a user identity portion 202 and associated user record data in a user data portion 203. In one embodiment, user identity portion 202 includes an identifier or ID number that indicates the identity of the subscriber user (e.g., subscriber user 110). User data portion 203 may contain any data provisioned within an SDM node that is associated with the subscriber user. User data portion 203 further includes a user profile portion 204 that comprises a data subset that is accessible and able to be parsed by a PCRF node or other application server. If PNR message 200 functions as a deletion notification message, user profile portion 204 may include an embedded deletion notification attribute 205 that originated from a previously modified user profile data stored in subscriber records database 106. By using this deletion notification mechanism, SDM node 102 is able to utilize a PNR message to notify PCRF node 104 of the requested deletion of the user record in subscriber record database 106. Although FIG. 2 depicts an exemplary Diameter PNR message, any other message (e.g., an XML Notify Request message) that includes a user profile portion 204 may be utilized without departing from the scope of the present subject matter.

As shown in FIG. 2, deletion notification attribute 205 may include a parameter name "lifetime" that is set to a value equal to zero (0). In one embodiment, the deletion notification attribute 205 in the user profile section of the PNR message may comprise a parameter such as <lifetime>0</lifetime> where "lifetime" is a newly defined attribute whose zero value (0) indicates the termination of a subscriber user's service from an access network is being requested. Alternatively, the deletion notification attribute may be embodied as <entitlement>lifetime_0</entitlement> where a previously defined attribute named "entitlement" includes a value that signifies the request for the termination/deletion of the subscriber user record associated with a user (e.g., subscriber user 110). In an alternate embodiment, deletion notification attribute 205 may include any attribute or parameter that is accessible and recognized by a receiving application server. For example, additional exemplary deletion notification attributes include <expired>yes</expired> or <entitlement>terminated</entitlement>.

The presence of deletion notification attribute 205 in a PNR message enables a receiving PCRF node (or other application server) to interpret and process the PNR message as a user record deletion notification message instead of a normal user profile update message. Accordingly, a deletion notification attribute is not included in a PNR message by SDM node 102 if there is only a user profile update (i.e., as opposed to an entire user profile deletion). Thus, a PNR message with the inserted deletion notification attribute is still considered a transparent update to the user profile to SDM node 102.

Figure 3:
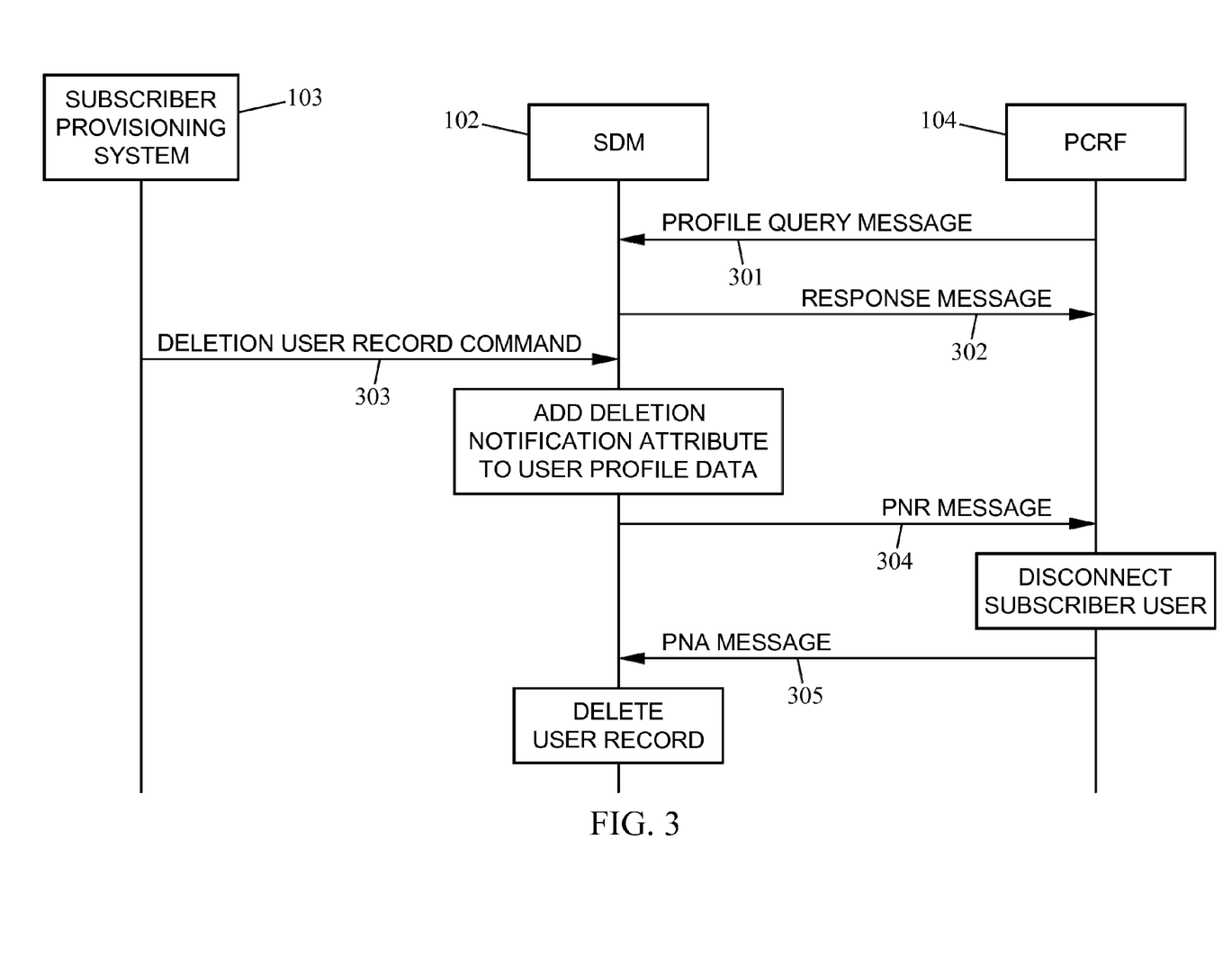
FIG. 3 is a message sequence diagram illustrating the providing of a user record deletion notification according to an embodiment of the subject matter described herein.

FIG. 3 is a message sequence diagram illustrating the providing a user record deletion notification according to an embodiment of the subject matter described herein. In one embodiment, PCRF node 104 sends a profile query message 301 to SDM node 102. In one embodiment, profile query message 301 may include a subscribe-notification request (SNR) message, which may be sent after the communication exchange of user-data-request (UDR) and user-data-answer (UDA) messages (not shown in FIG. 3). In an alternate embodiment, message 301 may comprise a combination of a UDR and a SNR in a single request message. To initiate a session for subscriber user 110, PCRF node 104 queries SDM node 102 for profile information associated with subscriber user 110. In one embodiment, PCRF node 104 applies various policies based on the user profile data provided by SDM node 102 in response message 302. In addition, profile query message 301 may also be used to request that PCRF node 104 be notified of any subscriber user profile changes in real-time so that PCRF node 104 may adjust the policies (e.g., billing changes) to be applied to the session associated with subscriber user 110. For example, message 301 may also serve as the PCRF node's subscription request for change notification). In an alternate embodiment, PCRF node 104 may send a separate message to SDM node 102 to request notification of the subscriber user profile changes in real-time.

After messages 301-302 are exchanged, subscriber provisioning system 103 in access network 101 may transmit a delete user record command message 303 to SDM node 102 indicating that the subscriber user's subscription to access network 101 is to be terminated/canceled. Upon receiving message 303, SDM node 102 updates subscriber user record database 106 by including a deletion notification attribute in the subscriber profile data associated with subscriber user 110 (e.g., in the event the PCRF node's subscription to a change notification is active). After adding the deletion notification attribute to the user profile data, SDM node 102 generates a PNR message 304. Notably, the generated PNR message 304 includes the deletion notification attribute previously added to the user profile data. As mentioned above, the user profile section of the PNR message may include a deletion notification attribute such as <lifetime>0</lifetime> where "lifetime" is a newly defined attribute whose zero value (0) indicates the termination of a subscriber user's service from an access network is being requested. Alternatively, the deletion notification attribute may be embodied as <entitlement>lifetime_0</entitlement> where a previously defined attribute named "entitlement" includes a value that signifies the request for the termination/deletion of the subscriber user record associated with a user (e.g., subscriber user 110). By generating PNR message 304 in this manner, the present subject matter is effectively "piggybacking" user deletion notification on an existing mechanism of user update notification.

In response to receiving the modified PNR message 304, PCRF node 104 may access and parse (e.g., read) the user profile portion of message 304 which contains the deletion notification attribute. If the deletion notification attribute contains a lifetime=0 parameter or the like, PCRF node 104 may then disconnect subscriber user 110 from the network. For example, a communication service connection established between the subscriber user and the access network may be terminated.

After receiving PNR message 304, PCRF node 104 responds by sending a Diameter Push Notifications Answer (PNA) message 305 to SDM node 102. In one embodiment, PNA message 305 includes a return result code that confirms the receipt of the data contained in PNR message 304. SDM node 102 may then delete the user record associated with subscriber user 110 after receiving PNA message 305. In an alternate embodiment, SDM node 102 may wait a pre-defined period of time and delete the user record without waiting for the PNA message from PCRF node 104.

Figure 4:
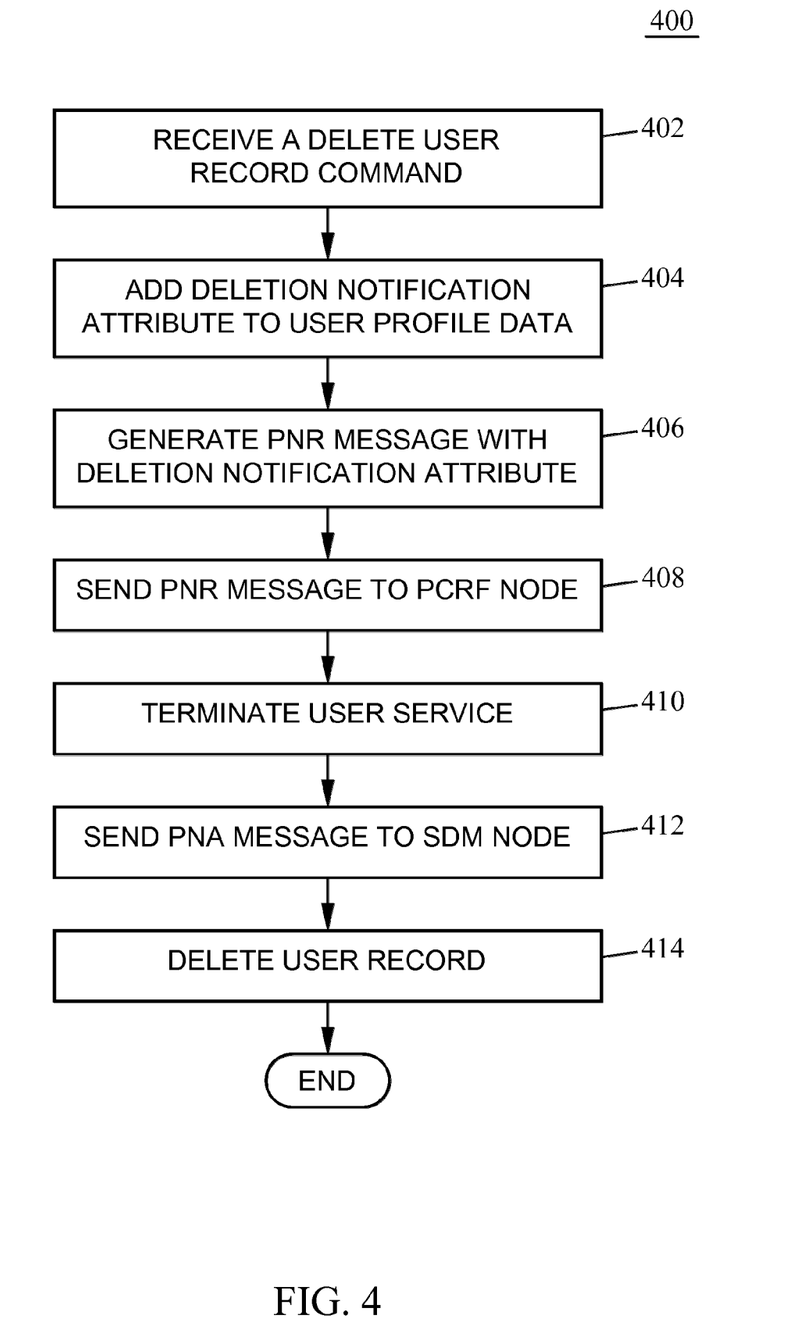
FIG. 4 is a flow chart illustrating a process for providing a user record deletion notification according to an embodiment of the subject matter described herein.

FIG. 4 is a flow chart illustrating a method 400 for providing a user record deletion notification according to an embodiment of the subject matter described herein. In block 402, a delete user record command message is received from an access network. In one embodiment, SDM node 102 receives a delete user record command message indicating that subscriber user 110 should no longer be provided access network service. For example, a service contract may have expired or the access network service has been terminated (by either the subscriber or the access network service provider). The delete user record command message may be sent to SDM node 102 by subscriber provisioning system 103 or some other network node in access network 101.

In block 404, a deletion notification attribute is added to the user profile data stored in SDM node 102. In one embodiment, SDM node 102 may receive the delete user record command message from subscriber provisioning system 103 and subsequently updates the corresponding user profile data in the user profile record (i.e., associated with subscriber user 110) with the deletion notification attribute stored in subscriber profile database 106. In one embodiment, the deletion notification attribute is only added to the user profile data if the PCRF nodes' subscription to a change notification is active. Otherwise, SDM node 102 simply deletes the user record at that time (i.e., an inactive change notification subscription indicates that the subscriber user is currently disconnected from the network and there is no active communication service connection).

In block 406, a PNR message is generated. In one embodiment, SDM node 102 generates a PNR message. Notably, the PNR message is generated such that the message includes a deletion notification attribute. For example, SDM node 102 may utilize the modified user profile data stored in database 106 to generate a PNR message. Consequently, the user profile portion 204 of the PNR message includes a deletion notification attribute. In one embodiment, the deletion notification attribute may comprise a variable/parameter called "lifetime" that is assigned a value of zero (0).

In block 408, the PNR message is sent. In one embodiment, SDM node 102 sends the PNR message to PCRF node 104 via a Sh interface connection.

In block 410, the received PNR message is processed. In one embodiment, PCRF node 104 receives the PNR message and subsequently parses the PNR message in a manner that detects the embedded deletion notification attribute 205 in user profile portion 204. As a result of receiving the deletion notification, a communication service connection established between the subscriber user and the access network may be terminated. For example, PCRF node 104 is configured to terminate the services previously provided to subscriber user 110 (e.g., by force-disconnecting the subscriber user from the access network).

In block 412, a PNA message is sent. In one embodiment, PCRF node 104 sends a Push Notifications Answer (PNA) message to SDM node 102. The PNA message serves as a return result code message that confirms the receipt of the PNR message that contained the deletion notification. In an alternate embodiment, SDM node 102 may wait a pre-defined period of time and delete the user record without waiting for the PNA message from PCRF node 104.

In block 414, the user record is deleted. In one embodiment, SDM node 102 deletes the user record associated with subscriber user 110 from subscriber user records database 106.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing a user record deletion notification, the method comprising:
    determining, at a subscriber data management (SDM) node, that a service subscription to an access network is to be terminated, wherein the service subscription is associated with a subscriber user;
    generating, at the SDM node, a Diameter notification message that includes a deletion notification attribute;
    sending, by the SDM node, the Diameter notification message via a Sh interface or a Ud interface to an application server associated with the access network;
    terminating, at the application server, a communication service connection established between the subscriber user and the access network in response to detecting the deletion notification attribute in the Diameter notification message, wherein detecting the deletion notification attribute includes accessing a user profile portion of the Diameter notification message to parse the deletion notification attribute; and
    deleting, in the SDM node, a user record associated with the service subscription after receiving notification of the connection termination.

2. The method of claim 1 wherein the SDM node includes a subscriber profile repository (SPR) node.

3. The method of claim 1 wherein the application server includes a policy control and charging rules function (PCRF) node, a telephony application server (TAS), or a short message service center (SMSC) node.

4. The method of claim 1 wherein the Diameter notification message includes a Diameter Push Notifications Request (PNR) message or an Extensible Markup Language (XML) Notify Request message.

5. The method of claim 1 wherein the Diameter notification message includes a message that is sent via an interface that supports change notification messaging and does not support deletion notification messaging.

6. The method of claim 1 wherein the deletion notification attribute includes a lifetime parameter set to a zero value.

7. The method of claim 1 wherein the deletion notification attribute includes an attribute value that indicates a request for the termination of the service subscription associated with the subscriber user.

8. The method of claim 1 wherein determining that the service subscription to the access network is terminated includes receiving, at the SDM node, a delete user record command message from a subscriber provisioning system node in the access network.

9. The method of claim 1 wherein the access network includes a 3G wireless network, a 4G wireless network, a Long Term Evolution (LTE) network, a cable fixed network, or a fiber optic service fixed network.

10. A system for provisioning a Diameter binding repository, the system comprising:
    a subscriber data management (SDM) node configured to determine that a service subscription to an access network is to be terminated, wherein the service subscription is associated with a subscriber user, generate a Diameter notification message that includes a deletion notification attribute, and send the Diameter notification message, and delete a user record associated with the service subscription in response to receiving a notification of a connection termination, wherein the SDM node is further configured to send the Diameter notification message via a Sh interface or a Ud interface; and
    an application server configured to receive the Diameter notification message, detect the deletion notification attribute in the Diameter notification message, delete a communication service connection established between the subscriber user and the access network, and provide the notification of the connection termination, wherein the application server is further configured to access a user profile portion of the Diameter notification message to parse the deletion notification attribute.

11. The system of claim 10 wherein the SDM node includes a subscriber profile repository (SPR) node.

12. The system of claim 10 wherein the application server includes a policy control and charging rules function (PCRF) node, a telephony application server (TAS), or a short message service center (SMSC) node.

13. The system of claim 10 wherein the Diameter notification message includes a Diameter Push Notifications Request (PNR) message or an Extensible Markup Language (XML) Notify Request message.

14. The system of claim 10 wherein the Diameter notification message includes a message that is sent via an interface that supports change notification messaging and does not support deletion notification messaging.

15. The system of claim 10 wherein the deletion notification attribute includes a lifetime parameter set to a zero value.

16. The system of claim 10 wherein the deletion notification attribute includes an attribute value that indicates a request for the termination of the service subscription associated with the subscriber user.

17. The system of claim 10 wherein the SDM node is further configured to receive a delete user record command message from a subscriber provisioning system node in the access network.

18. The system of claim 10 wherein the access network includes a 3G wireless network, a 4G wireless network, a Long Term Evolution (LTE) network, a cable fixed network, or a fiber optic service fixed network.

19. A non-transitory computer readable medium comprising computer executable instructions embodied in a computer readable medium that when executed by a processor of a computer control the computer to perform steps comprising:
- determining, at a subscriber data management (SDM) node, that a service subscription to an access network is to be terminated, wherein the service subscription is associated with a subscriber user;
- generating, at the SDM node, a Diameter notification message that includes a deletion notification attribute;
- sending, by the SDM node, the Diameter notification message via a Sh interface or a Ud interface to an application server associated with the access network;
- terminating, at the application server, a communication service connection established between the subscriber user and the access network in response to detecting the deletion notification attribute in the Diameter notification message, wherein detecting the deletion notification attribute includes accessing a user profile portion of the Diameter notification message to parse the deletion notification attribute; and
- deleting, in the SDM node, a user record associated with the service subscription after receiving notification of the connection termination.

\* \* \* \* \*